(12) United States Patent
Taguchi

(10) Patent No.: US 7,134,048 B2
(45) Date of Patent: Nov. 7, 2006

(54) LOGICAL UNIT SECURITY FOR CLUSTERED STORAGE AREA NETWORKS

(75) Inventor: Yuichi Taguchi, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/228,069

(22) Filed: Sep. 15, 2005

(65) Prior Publication Data

US 2006/0041728 A1    Feb. 23, 2006

Related U.S. Application Data

(63) Continuation of application No. 10/787,501, filed on Feb. 25, 2004.

(51) Int. Cl.
*G06F 11/20*    (2006.01)

(52) U.S. Cl. .................. 714/13; 711/163; 711/150; 714/55

(58) Field of Classification Search .................. 714/13
See application file for complete search history.

(56) References Cited

U.S. PATENT DOCUMENTS

| | | | |
|---|---|---|---|
| 5,398,329 A | 3/1995 | Hirata et al. | |
| 5,802,591 A * | 9/1998 | Yachida | 711/164 |
| 6,041,381 A | 3/2000 | Hoese | |
| 6,061,750 A | 5/2000 | Beardsley et al. | |
| 6,219,771 B1 | 4/2001 | Kikuchi et al. | |
| 6,275,953 B1 * | 8/2001 | Vahalia et al. | 714/11 |
| 6,457,098 B1 | 9/2002 | DeKoning et al. | |
| 6,553,401 B1 * | 4/2003 | Carter et al. | 709/200 |
| 6,643,795 B1 * | 11/2003 | Sicola et al. | 714/6 |
| 6,862,613 B1 * | 3/2005 | Kumar et al. | 709/220 |
| 2001/0020282 A1 | 9/2001 | Murotani et al. | |
| 2002/0083339 A1 * | 6/2002 | Blumenau et al. | 713/201 |
| 2002/0087912 A1 * | 7/2002 | Kashyap | 714/13 |
| 2003/0014600 A1 | 1/2003 | Ito et al. | |
| 2003/0126381 A1 | 7/2003 | Vo | |
| 2003/0200399 A1 | 10/2003 | Dawkins et al. | |
| 2004/0015668 A1 | 1/2004 | McBrearty et al. | |
| 2004/0098542 A1 | 5/2004 | Araki et al. | |
| 2004/0139196 A1 | 7/2004 | Butler et al. | |
| 2004/0143712 A1 | 7/2004 | Armstrong et al. | |

FOREIGN PATENT DOCUMENTS

EP    1276034 A2    1/2003

OTHER PUBLICATIONS

"Using VERITAS Volume Manager™ for Windows with Microsoft Cluster Server (MSCS)," Veritas Software Corp. pp. 5-8 (Mar. 2002).
"VERITAS Database Edition/Advanced Cluster™ for Oracle8i," Veritas Software Corp. pp. 1-6. (Dec. 2001).
Jackson et al. "SAN Security Architectures," Imation Enterprises, Inc. Oakdale, MN (2000).
Yoshida "LUN Security Considerations for Storage Area Networks," Hitachi Data Systems Corp. pp. 1-7 (Oct. 1999).

* cited by examiner (Continued)

*Primary Examiner*—Donald Sparks
*Assistant Examiner*—Jesse Diller
(74) *Attorney, Agent, or Firm*—Townsend and Townsend and Crew LLP

(57) ABSTRACT

A system is described in which a plurality of host computers are coupled to a storage system for storing and retrieving data in the storage system. The storage system includes individually addressable units of storage such as volumes or logical unit numbers. A security management system controls access to each of the individually addressable units of storage based upon the identification of the host permitted to access that unit of storage.

5 Claims, 5 Drawing Sheets

| Storage ID | I/F ID | Volume ID | Host ID | Access Control |
|---|---|---|---|---|
| Array #0 | Port #0 | Volume #2 | Host #6 | Permit |
| | | | Host #8 | Deny |
| | | | Host #9 | Permit |
| | | Volume #3 | Host #8 | Permit |
| | | | Host #9 | Permit |
| | | | Host #12 | Deny |
| | Port #1 | Volume #4 | Host #20 | Deny |
| | | | Host #21 | Permit |
| ... | ... | ... | ... | ... |

Figure 3

| I/F ID | Volume ID | Host ID | Access Control |
|---|---|---|---|
| Port #0 | Volume #2 | Host #6 | Permit |
| | | Host #8 | Deny |
| | | Host #9 | Permit |
| | Volume #3 | Host #8 | Permit |
| | | Host #9 | Permit |
| | | Host #12 | Deny |
| Port #1 | Volume #4 | Host #20 | Deny |
| | | Host #21 | Permit |
| ... | ... | ... | ... |

Figure 4

| Host ID | Volume ID | Ownership Status |
|---------|-----------|------------------|
| Host #8 | Volume #2 | Acquired |
|         | Volume #3 | Lost |

Figure 6

| Port ID | Volume ID | Host ID | Access Control |
|---------|-----------|---------|----------------|
| Port #0 | Volume #2 | Host #8 | Permit |
|         | Volume #3 | Host #8 | Deny |

Figure 7

LOGICAL UNIT SECURITY FOR CLUSTERED STORAGE AREA NETWORKS

This application is a continuation of U.S. patent application Ser. No. 10/787,501, filed Feb. 25, 2004, the entire disclosure of which is incorporated herein by reference.

BACKGROUND OF THE INVENTION

This invention relates to storage area networks, and in particular, to security of data in such storage area networks.

Storage area networks (SAN) are now widely deployed around the world to provide storage facilities for computing environments. The consolidation of storage into large facilities allows for more efficient administration and control, and enables the provision of highly reliable backup and redundancy systems to dramatically limit data loss from system failures or natural catastrophes. The benefits of such storage have caused a dramatic increase in its use throughout the world.

Storage area networks are designed to allow access from many different host systems so the data may be reliably retrieved and stored from different locations under the control of different processors. Such storage and retrieval is often carried out over public networks, such as the internet.

To more effectively enable access to the storage system, it is usually configured into smaller portions which can be allocated to different processors or other resources requiring the storage. For example, conventional storage systems include a large number of hard disk drives, with each hard disk drive itself including many gigabytes of storage. One way to divide the storage resource into smaller portions is to create Logical Units that are assigned a unique Logical Unit Number. Each LU itself consists of a numeric address, thereby permitting the large storage system to appear as many smaller storage units to the host computers accessing them, enabling more efficient operation.

The LUs are typically assigned to hosts so that a particular LU may be accessed only by designated hosts which have "permission" to access that portion of the storage system. This provides enhanced security as the software controlling access to the storage system will only permit access by certain previously defined hosts. While it is somewhat arbitrary how many hosts are permitted to access a given LU, conventionally only one host usually has access rights to a given LU at a given time. In this manner the data on the LU is protected against access by hosts or servers other than those previously designated, thereby enhancing the security of the data.

The SAN itself usually consists of one or more disk array devices, for example configured under a selected RAID protocol, with multiple host devices connected by fiber channel switch network devices or other well known means to the storage area network. Inside the architecture, host computers run cluster management software to negotiate with each other to determine which hosts "own" which portions of the storage or LUs. A commonly known "failover" function enables the clustered architecture of the SAN to be highly available. In a failover situation, a failure occurs, but is made relatively transparent to the user of the system by transferring operations that were running on one node to another node or nodes within that cluster of nodes.

The hosts and SAN are configured in a clustered environment in which more than one host has access to a given SAN. The host is typically a computer, for example an application server or a database server. The traditional clustering software used to provide this configuration has a limitation in that a portion of the storage, for example, an LUN, must be configured to allow I/O access from all host nodes in the cluster. For example, if host node A is running an application X, and they are in the same cluster, it is desirable that if host A fails, the task of application X be taken over by another host B. When this happens the LU security for applications must be set to allow I/O access from both hosts A and B. If such multiple access is routinely provided by the set-up program at system initialization, however, it can be a cause of data corruption resulting from the wrong access of the data.

This invention provides an improved method and system for security in such an environment by enabling dynamic changes in the LU security to allow a different host to access a particular portion of the storage after a failure, when that host could not have accessed that portion of the storage before the failure.

BRIEF SUMMARY OF THE INVENTION

The system of this invention is particularly applicable to host nodes which are configured in a cluster system. During the initialization of such a system, the host computers negotiate to gain ownership to access the data storage resources which are divided on the basis of LUs (or volumes or other units). Each LU is then configured to permit and reject I/O accesses by hosts, typically based on IDs assigned to the hosts, such as WWN, port ID. In the primary security configuration, one LU may allows I/O access only from one host.

According to this invention, if a problem occurs in the primary host group (assigned to the particular LU), another host group takes over execution of that process to continue system activity. At the time this occurs, the cluster management software running on the host detects the change in ownership and notifies the storage device that ownership for that LU has been changed. The LU security function in the storage device then dynamically changes its security configuration to allow I/O accesses from the new host. As a result, this invention provides improved security. Secondary hosts within the cluster that run the application processes are thereby not permitted to access the LU until they have obtained that right, typically as a result of a failure in the primary host. While operating in this manner, data corruption at the LU level is greatly reduced, and access of that data by unauthorized applications in generally prevented.

In one embodiment in a system having a first host computer, a second host computer, and a storage, and in which access to at least a portion of the storage is controlled to permit access to the storage by the first host, and prevent access to the storage by the second host, a method of changing the authorization for access to the storage includes informing the security system of a negotiation between the hosts and restricting access to the portions to the host that acquired such access in the negotiation.

BRIEF DESCRIPTION OF THE DRAWINGS

FIG. 3 illustrates a sample data structure for storage configuration information;

FIG. 4 illustrates a sample data structure for security configuration information;

FIG. 6 is a diagram illustrating an ownership change message; and

FIG. 7 is a diagram illustrating an access control status change message.

DETAILED DESCRIPTION OF THE INVENTION

Figure 1:
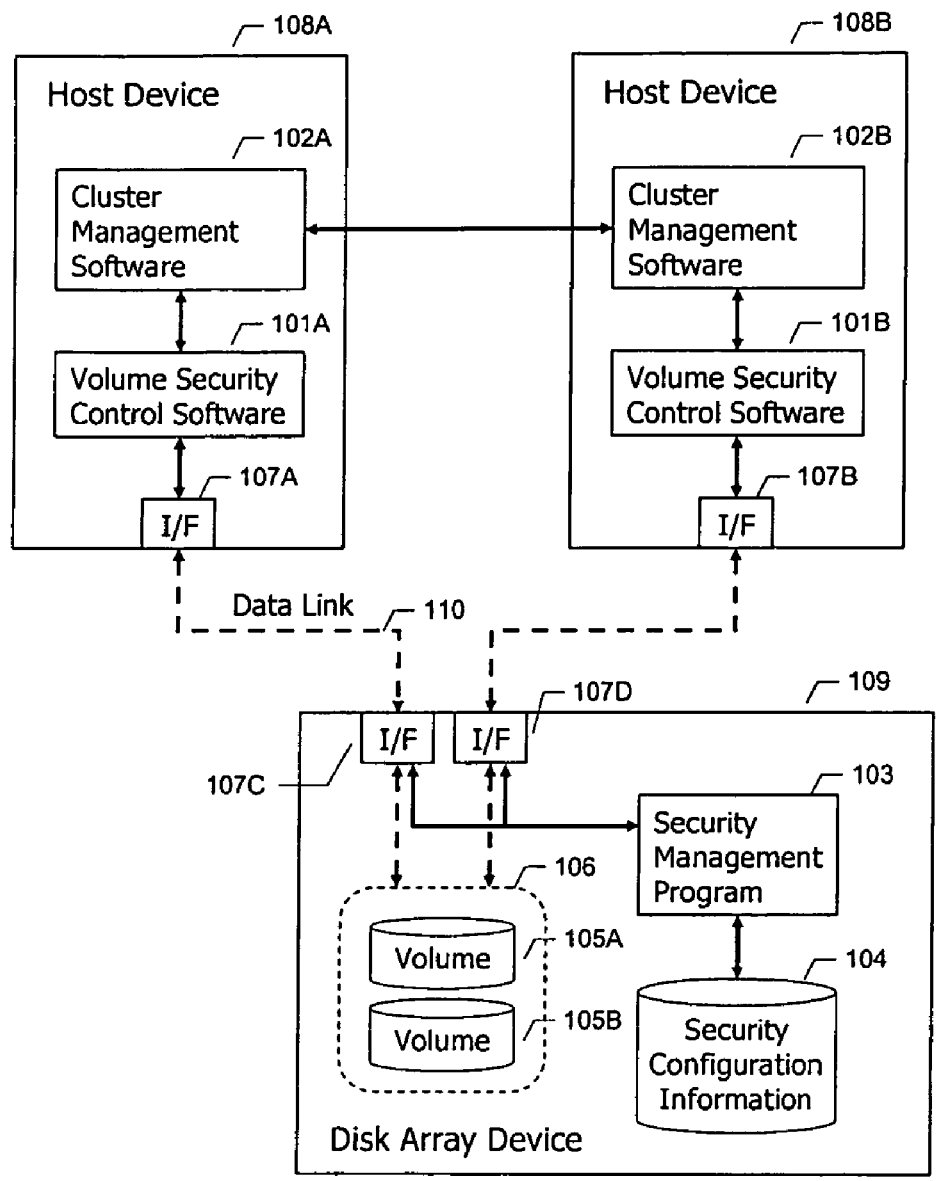
FIG. 1 is a block diagram illustrating an in-band system implementation.

FIG. 1 is a block diagram illustrating a typical system configuration for a storage area network. As illustrated, the overall system includes a first host device 108A and a second host device 108B. These host devices are typically computers or application servers of well known design. The hosts are coupled to a storage system 109, typically made up of a disk array, for example configured in accordance with a RAID protocol. The disk array 109 typically includes a large number of disk drives 106, of which one is illustrated. Disk 106 has been configured to have two volumes 105A and 105B.

The hosts 108 and storage system 109 are coupled together using a suitable means for exchanging data between them. A data link 110 is illustrated in FIG. 1. The data link 110 can take any appropriate format, for example, a fibre channel network, a local area network, the internet, a private network, a network switch device, or any other interconnection means.

In a typical storage system 109, large numbers of storage volumes such as 105A and 105B will be provided. The storage volumes 105 themselves, or even portions thereof, are given logical unit numbers (LUNs) or other identification to identify them and/or provide addressing information for the addressing of information to be stored in those storage volumes, or retrieved from those storage volumes. The storage system 109 and the hosts 108 each include an interface 107 to provide an interface to the network. Interface 107 conventionally is provided by using a host bus adapter (HBA) or a gigabit Ethernet card, or other known interface. The selection of any particular interface will depend primarily upon the configuration of the data link 110 to which it is coupled.

Each of the hosts includes cluster management software 102 which operates on that host. The cluster management software in each host is coupled to similar software in other hosts. For example, as shown in FIG. 1, the cluster management software 102A operating on host device 108A is coupled to communicate with the cluster management software 102B operating on host 108B. The cluster management software communicates with the corresponding software on other hosts to determine the ownership of storage volumes 105 for a particular host. Each storage volume 105 can be accessed by one or more computers that have the ownership for the volume. During initialization of the system, the hosts receive the LUNs, and, either independently, or with support from a system operator, the hosts decide which LUNs are to be associated with each host. After this has been determined, the volume security control software 101 requests the storage device 109 to allow I/O accesses from that host to the designated volumes 105. Once the system has been appropriately initialized, then the security management program 103 in storage system 109 controls access to the storage volumes 105. The security management program stores the security configuration information 104 in a protected area for later use.

Figure 2:
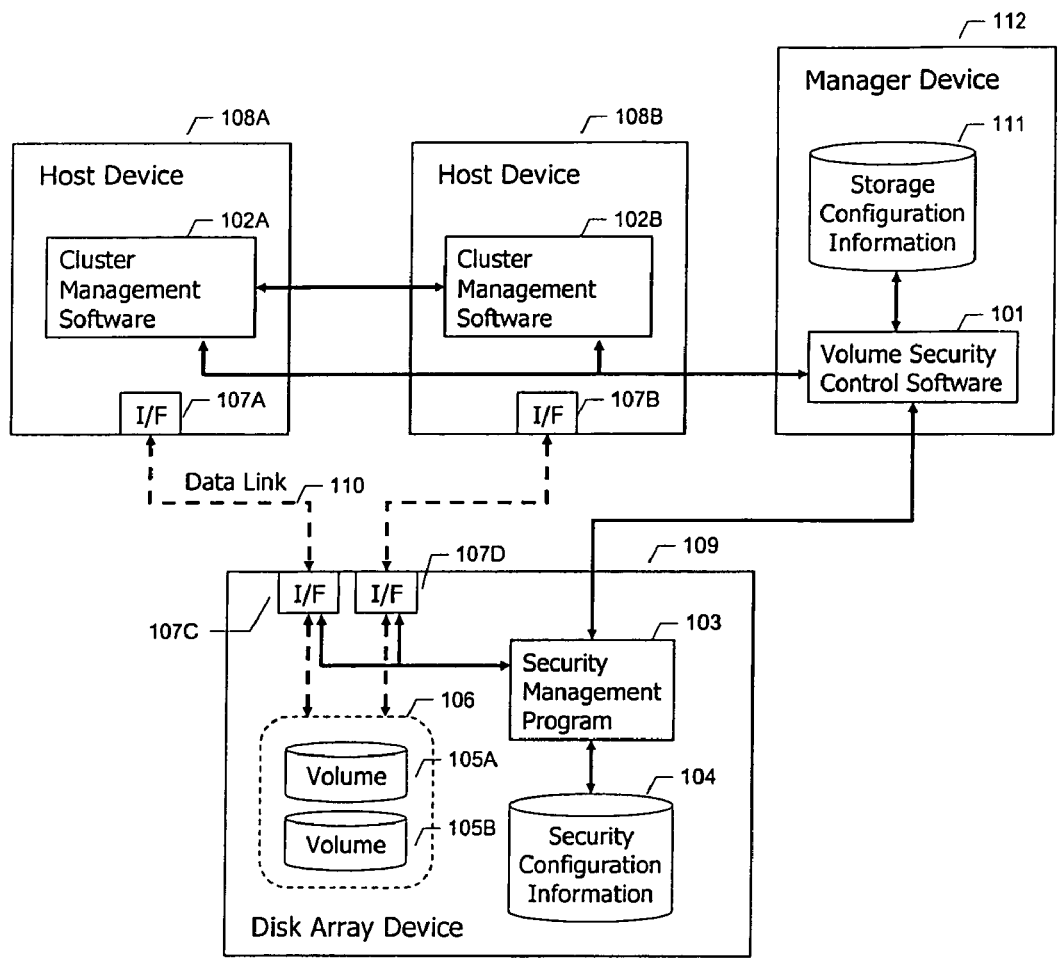
FIG. 2 is a block diagram illustrating an out-of-band system implementation.

The system illustrated in FIG. 1 is often termed an "in-band" control system. FIG. 2 illustrates a different control system referred to as an "out-of-band" control system. The storage system 109 is the same in FIG. 2 as that described in FIG. 1. In contrast, however, the architecture of the system illustrated in FIG. 2 places the responsibility for volume security control on a storage manager 112. Storage manager 112 is coupled to each of the hosts, and is responsible for the volume security control software 101. This software provides the same functionality as the volume security control software 101 provided in the system configuration shown in FIG. 1. The volume security control software 101 running on the storage manager 112 coordinates management of the volume security. It also monitors the storage system and stores information about the configuration of the storage system and the like in local storage 111.

FIG. 3 is a diagram illustrating the data structure for storage configuration information 111 (shown in FIG. 2). This diagram illustrates how access is controlled to various portions of the storage. In FIG. 3 to provide an example, volumes 2, 3 and 4 are shown in the column "Volume ID." Each volume is allocated to one or more ports to be activated. As shown by the diagram, volumes 2 and 3 are allocated to port 0, while volume 4 is allocated to port 1. The storage ID shown in FIG. 3 is a storage identification parameter. This parameter identifies the storage asset, usually by serial number, node World Wide Name, or vendor-specific identification number. The node World Wide Name is a fixed, unique address that is assigned to disk array device 109. In FIG. 3 the storage ID is shown as "Array #0" representing the first disk array associated with the storage product. The interface identification number (port 0 or port 1) represents the unique identification associated with a given network interface. Alternatively, the port WWN, or Port ID which are assigned to each port can be used to provide this information. The port WWN is a fixed, unique address that is assigned to each port. The port ID is an unique identifier that is assigned to each network interface hardware. Also, IP address or MAC address can be used if I/F 107 is a Ethernet card.

The host identification ("Host ID" in FIG. 3) represents an identifier to designate a host that is permitted or restricted to access the particular designated volume (in that row of the table). The LUN security function uses the node WWN of the host, or the port WWN of the HBA, or the MAC address of the network card installed on the host to provide this identification parameter. To illustrate its operation, FIG. 3 shows the hypothetical example that volume 3 on port 0 of array 0 is allowed to be accessed by hosts 8 and 9, but access is not permitted for host 12.

FIG. 4 is a diagram illustrating an example of the data structure for the security configuration information 104 found in disk array unit 109. As shown by FIG. 4, this data structure is synchronized with, and corresponds to, the storage configuration information 111 from the management unit 112. As also illustrated, the storage ID is not required since this information is maintained in the storage unit itself (as identified by FIG. 3).

Figure 5:
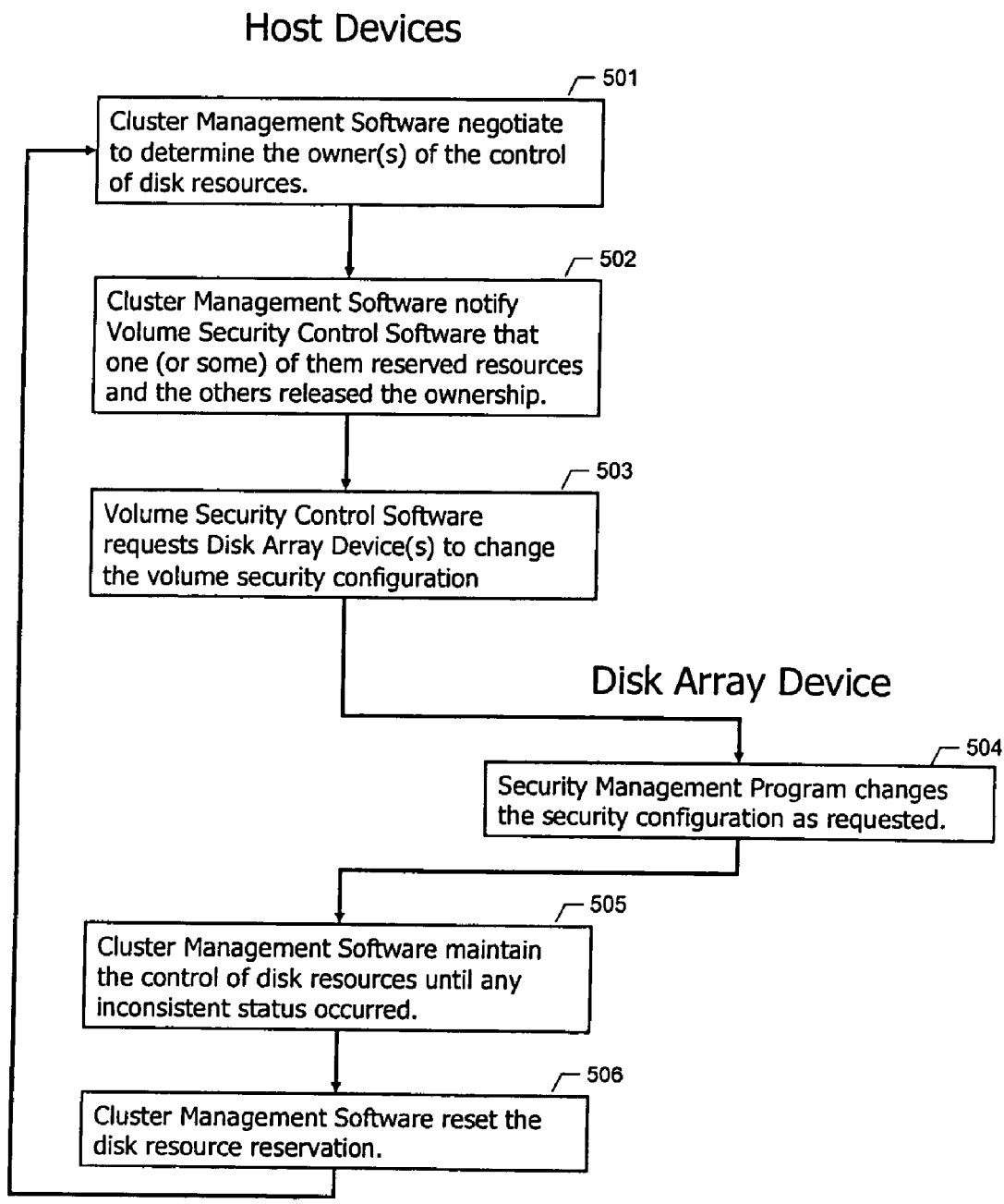
FIG. 5 is a flowchart illustrating one embodiment of the method of this invention.

FIG. 5 is a flowchart illustrating a preferred embodiment of the method of operation of this invention. The diagram shown in FIG. 5 is divided into two parts—operations that occur within the host (on the left of the diagram), and operations that occur within the disk array (skewed to the right of the diagram). The process begins with step 501 in the host in which cluster management software negotiates to determine the ownership or control of the disk resources. With reference to FIG. 1, this step is carried out by the software 102A in host 108A negotiating with the software 102B in host 108B. Such a negotiation typically uses the known SCSI-3 persistent reserve algorithm, or the SCSI-2 challenge/defense protocol. At the conclusion of the process, the host computers will have rights to access particular LUNs (or volumes) in the disk array.

Step 502 in FIG. 5 illustrates that the negotiation concludes with the cluster management software notifying the volume security control software of the results of the negotiation. The volume security control software 101, as described in conjunction with FIGS. 1 and 2, will reside either in each of the hosts (FIG. 1) or in a manager (FIG. 2).

FIG. 6 is an illustration of an ownership change message sent by the cluster management software 102 to the volume security control software 101. As shown in FIG. 6, the hypothetical message illustrates that volume number 2 has been acquired by host number 8, and that volume number 3 has been lost to host number 8.

Returning to the process illustrated in FIG. 5, after sending the message, at step 503 the volume security control software 101 will request the disk array 109 to change the configuration for volume security. This is carried out by the volume security control software 101 sending a request message to the security management program 103 found in the disk array 109. This message requests changes in the LUN (or volume) security configuration.

FIG. 7 illustrates a typical message sent by the volume security control software 101 to the security management program 103. As shown in FIG. 7, an access control status change message is being transferred to illustrate that host number 8 is now permitted to access volume number 2 and is no longer permitted to access volume number 3.

Again returning to FIG. 5, once the message of FIG. 7 is received by the security management program 103, it carries out step 504 in FIG. 5. At this time the security management program 103 reconfigures the LU security settings and updates the security configuration information 104. This operation will result in new entries in the security configuration information table (shown in FIG. 4) by which the status for volume number 2 and host number 8 is changed from "deny" to "permit." Similarly, the status for volume number 3 and host number 8 is switched from "permit" to "deny."

Following the disk array device operation of step 504, the host device carries out step 505. In this step the cluster management 102 software maintains control of the disk resources to verify that no inconsistent status has occurred. This is typically carried out using a "heartbeat" communication protocol. As shown by step 506 in FIG. 5, if the heartbeat is lost, or if an inconsistent status is detected, then the cluster management software 102 will reset the system and restart the negotiation process to allocate disk resources to hosts.

The foregoing has been a description of preferred embodiments of this invention. It should be appreciated that departures from the specific embodiment illustrated may be made while remaining within the scope of this invention. For example security for the storage devices may be implemented on the basis of other than LUs or volumes, instead using addresses or other designations. The scope of the invention is defined by the appended claims.

What is claimed is:

1. In a clustering system having primary and secondary host computers coupled to a storage system and a management computer, wherein the primary and secondary host computers include cluster management functions, wherein the storage system includes a LUN security function therein so that one or more predetermined host computers of the system can access a portion of disk drives in the storage system, wherein the primary and the secondary host computers communicate using a heartbeat communication protocol, a method comprising:

storing access control information in the storage system, in connection with host identification information and logical unit identification information, wherein the LUN security function in the storage system allows the primary host computer to access a specific logical unit of the portion of disk drives and disallows the secondary host computer to access the specific logical unit based on the access control information;

changing ownership for the specific logical unit from the primary host computer to the secondary host computer by the cluster management functions;

based upon ownership information provided by the cluster management functions, coordinating management of security for the specific logical unit in the management computer based on corresponding information to the access control information, the corresponding information to the access control information being stored in the management computer; and changing the access control information in the storage system, for disallowing the primary host computer to access the specific logical unit and allowing the secondary host computer to access the specific logical unit based upon a request for changing the access control information;

wherein the request for changing the access control information is issued in connection with communication between the primary and the secondary host computers using the heartbeat communication protocol.

2. The method of claim 1, wherein the request for changing the access control information is issued after the secondary host computer gains ownership for the logical unit.

3. The method of claim 2, wherein the secondary host computer gains ownership of the logical unit when detecting a change of conditions in the primary host computer.

4. The method of claim 3, wherein the condition comprises a fault condition.

5. In a clustering system having a primary host computer and a secondary host computer which communicate using a heartbeat communication protocol and which are coupled to a storage system and a management computer, wherein the primary and secondary host computers include cluster management functions, wherein the storage system has an access control function therein so that one or more predetermined host computers of the clustering system can access a portion of disk drives in the storage system, a method comprising:

storing access control information in the storage system, in connection with host identification information and logical unit identification information, wherein the LUN security function in the storage system allows the primary host computer to access a specific logical unit of the portion of disk drives and disallows the secondary computer to access the specific logical unit based on the access control information;

changing ownership for the specific logical unit from the primary host computer to the secondary host computer by the cluster management functions;

based upon ownership information provided by the cluster management functions, coordinating management of security for the specific logical unit in the management computer based on corresponding information to the access control information, the corresponding information to the access control information being stored in the management computer; and changing the access control information in the storage system, for disallowing the primary host computer to access the specific logical unit and allowing the secondary host computer to access the specific logical unit based upon a request for changing the access control information from the management computer;

wherein the request for changing the access control information is coordinated by the management computer and is issued in connection with communication between the primary and the secondary host computers using the heartbeat communication protocol.

* * * * *